(12) United States Patent
Negoro et al.

(10) Patent No.: US 8,154,240 B2
(45) Date of Patent: Apr. 10, 2012

(54) CONTROL APPARATUS FOR ELECTRIC RAILCAR

(75) Inventors: Hideto Negoro, Chiyoda-ku (JP); Masaki Kono, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 467 days.

(21) Appl. No.: 12/513,481

(22) PCT Filed: Dec. 5, 2006

(86) PCT No.: PCT/JP2006/324215
§ 371 (c)(1),
(2), (4) Date: May 4, 2009

(87) PCT Pub. No.: WO2008/068841
PCT Pub. Date: Jun. 12, 2008

(65) Prior Publication Data
US 2010/0060212 A1    Mar. 11, 2010

(51) Int. Cl.
*H02P 27/04* (2006.01)
(52) U.S. Cl. .................... 318/801; 318/400.07; 318/800; 318/257; 318/376; 318/269; 361/90; 361/33; 361/91; 701/22; 180/65.245; 180/65.29
(58) Field of Classification Search ............. 318/400.02, 318/400.03, 139, 801, 400.07, 376, 269, 318/800, 257; 361/33, 90, 91; 701/22; 180/65.245, 180/65.29
See application file for complete search history.

(56) References Cited

U.S. PATENT DOCUMENTS
4,570,111 A * 2/1986 Sato ............................... 388/806
2008/0048607 A1 * 2/2008 Kono ............................ 318/802

FOREIGN PATENT DOCUMENTS
JP    2000-116189 A    4/2000
(Continued)

OTHER PUBLICATIONS
Office Action (Korean Intellectual Property Office Notice of Preliminary Rejection) dated Feb. 22, 2011, issued in the corresponding Korean Patent Application No. 2009-7009242, and an English Translation thereof.
(Continued)

*Primary Examiner* — Walter Benson
*Assistant Examiner* — Jorge Carrasquillo
(74) *Attorney, Agent, or Firm* — Buchanan Ingersoll & Rooney PC

(57) ABSTRACT

A control apparatus for an electric railcar includes an inverter that exchanges power with an AC rotating machine, a filter capacitor connected in parallel to a DC side of the inverter, a filter reactor provided between the filter capacitor and an overhead line, an overhead line voltage measuring instrument that measures a voltage value of the overhead line, a voltage increase detection unit that senses an amount of voltage increase occurring when, with an overhead line voltage being supplied, the overhead line voltage goes beyond a reference voltage value and rises at a rate equal to or higher than that by a predetermined time constant. A correction torque command value calculation unit calculates a correction torque command value that is corrected so that a torque command value to be received from an external unit becomes smaller for a predetermined time elapsing after the voltage increase detection unit has sensed, during regeneration operation of the inverter, an amount of voltage increase more than a predetermined range. A vector control unit controls the inverter so that the AC rotating machine develops torque coincident with the correction torque command value.

15 Claims, 16 Drawing Sheets

FOREIGN PATENT DOCUMENTS

| | | | | |
|---|---|---|---|---|
| JP | 2000116189 | A | * | 4/2000 |
| JP | 2001-008308 | A | | 1/2001 |
| JP | 2001008308 | A | * | 1/2001 |
| JP | 2003-230202 | A | | 8/2003 |
| JP | 2003230202 | A | * | 8/2003 |
| JP | 2004-088974 | A | | 3/2004 |
| JP | 2004088974 | A | * | 3/2004 |

OTHER PUBLICATIONS

International Search Report for PCT/JP2006/324215, mailed Feb. 27, 2007.

* cited by examiner

CONTROL APPARATUS FOR ELECTRIC RAILCAR

TECHNICAL FIELD

The present invention relates to control apparatuses for electric railcars, in which an alternating current (AC) rotating machine that drives an electric railway vehicle(s) is controlled by an inverter.

BACKGROUND ART

A conventional control apparatus of an electric railcar includes light-load regeneration control means that calculates, with a voltage across a direct-current (DC) filter capacitor (hereinafter called capacitor voltage) being supplied as an input, a regeneration control torque current during regeneration operation. The light-load regeneration control means includes one integral control means and two proportional control means, with a difference between a capacitor voltage and a DC voltage target value serving as an input. For that reason, even if a load varies during the regeneration operation, the integral control means allows the voltage between an overhead line and a rail (hereinafter called overhead line voltage) to stay at a predetermined value. By combining two proportional control means together and then providing a feedback control of a voltage proportional to that obtained by removing that of a low frequency component from the capacitor voltage, a voltage jump (surge) on the overhead line occurring when the load drops off can be suppressed. Patent Document 1 discloses that, in suppressing the voltage jump (surge) on the overhead line occurring when the load drops off, the use of any one of a voltage across the DC filter capacitor and the overhead line voltage as an input also provides the same advantageous effect.
[Patent Document 1]
Japanese Unexamined Patent Publication No. 2004-88974

DISCLOSURE OF INVENTION

[Problem that the Invention is to Solve]

It has been found by the inventors that in the regeneration operation, immediately after the load drop occurs, an overhead line voltage rated at 1500 V sharply increases to about 200V or more and then sharply returns to the value before the sharp increase, and although a capacitor voltage has no variation immediately after the load drops off, the capacitor voltage and the overhead line voltage increase after fluctuation of the overhead line voltage has calmed down. When the capacitor voltage serves as an input voltage, detection of the load drop may in some cases be delayed, causing an increase in the capacitor voltage not to be limited, which in turn activates an overvoltage protection device. With activation of the overvoltage protection device, the regeneration brake is not allowed to operate during the subsequent predetermined period, which causes a mechanical brake alone to be used, thus resulting in developing wear on the mechanical brake.

The present invention is directed to overcome the above-described problems, and an object thereof is to provide a control apparatus for an electric railcar ensuring suppression of a capacitor voltage increase occurring when the load drops off during regeneration operation.
[Means for Solving the Problem]

A control apparatus of an electric railcar according to the present invention comprises an inverter that exchange power with an AC rotating machine; a filter capacitor connected in parallel to a DC side of the inverter; a filter reactor provided between the filter capacitor and an overhead line; an overhead line voltage measuring instrument that measures a voltage value of the overhead line; a voltage increase detection unit to which an overhead line voltage measured using the overhead line voltage measuring instrument is supplied, the voltage increase detection unit sensing an amount of voltage increase occurring when the overhead line voltage goes beyond a reference voltage value and rises as varying at a rate higher than that by a predetermined time constant; a correction torque command value calculation unit that calculates a correction torque command value that is corrected so that a torque command value to be received from an external unit becomes smaller for a predetermined time elapsing after the voltage increase detection unit has sensed, during regeneration operation of the inverter, an amount of voltage increase of equal to or more than a predetermined range; and a vector control unit that controls the inverter so that the AC rotating machine develops torque coincident with the correction torque command value.

ADVANTAGEOUS EFFECTS OF THE INVENTION

A control apparatus of an electric railcar according to the present invention comprises an inverter that exchange power with an AC rotating machine; a filter capacitor connected in parallel to a DC side of the inverter; a filter reactor provided between the filter capacitor and an overhead line; an overhead line voltage measuring instrument that measures a voltage value of the overhead line; a voltage increase detection unit to which an overhead line voltage measured using the overhead line voltage measuring instrument is supplied, the voltage increase detection unit sensing an amount of voltage increase occurring when the overhead line voltage goes beyond a reference voltage value and rises as varying at a rate higher than that by a predetermined time constant; a correction torque command value calculation unit that calculates a correction torque command value that is corrected so that a torque command value to be received from an external unit becomes smaller for a predetermined time elapsing after the voltage increase detection unit has sensed, during regeneration operation of the inverter, an amount of voltage increase equal to or more than a predetermined range; and a vector control unit that controls the inverter so that the AC rotating machine develops torque coincident with the correction torque command value. Thus, there is an advantageous effect that ensures suppression of a capacitor voltage increase occurring when a load drops off during regeneration operation.

BRIEF DESCRIPTION OF DRAWINGS

FIGS. 5 (a) and 5(b) are graphs illustrating a relationship between an overhead line voltage showing operation of the voltage increase detection unit and a voltage increase according to Embodiment 1 of the present invention.

Figure 1:
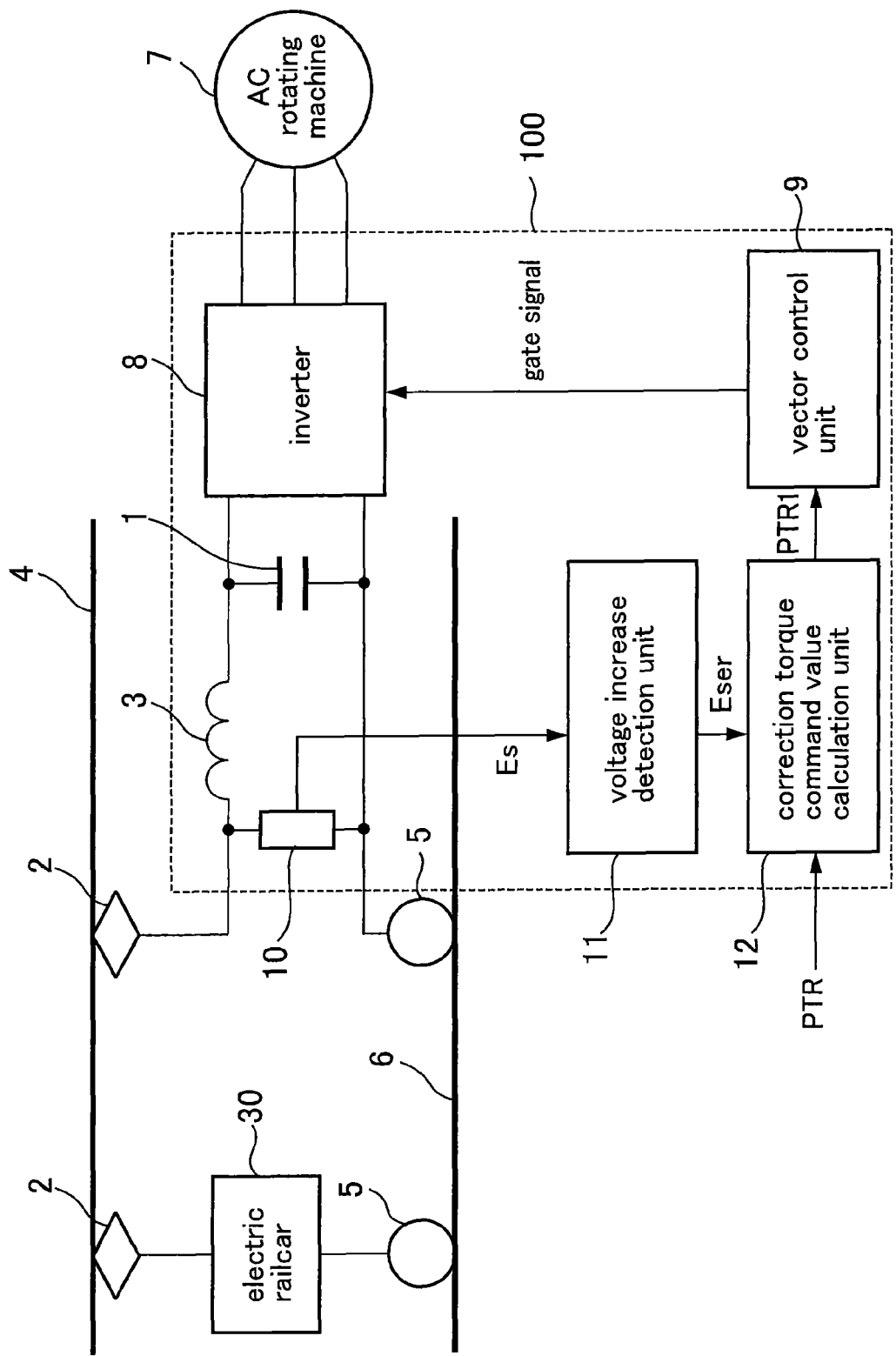
FIG. 1 is a schematic diagram illustrating an example of a configuration of a control apparatus for an electric railcar according to Embodiment 1, Embodiment 3, Embodiment 5 and Embodiment 7 of the present invention.

REFERENCE NUMERALS 100, 100A control apparatus for an electric railcar
1 filter capacitor
2 pantagraph
3 filter reactor
4 overhead line
5 wheel
6 rail
7 AC rotating machine
8 inverter
9 vector control unit
10 overhead line voltage measuring instrument,
11, 11A, 11B, 11C voltage increase detection unit
12, 12A correction torque command value calculation unit
13 overhead line voltage determination unit
14 variation removal filter
15 subtracter
16 zero correction limiter
17 torque correction parameter table
18, 18A torque correction cancellation unit
19 subtracter
20 correction parameter calculation unit
21 subtracter
22 cancellation condition determination unit
23 switch
24 previous-control-parameter preservation unit
25 adder
26 variable limiter
30 electric railcar
31 capacitor voltage measuring instrument
32 torque correction cancellation parameter table
33 reference voltage value table

BEST MODE FOR CARRYING OUT THE INVENTION

Embodiment 1

FIG. 1 is a schematic diagram showing an example of a configuration of a control apparatus for an electric railcar according to Embodiment 1 of the present invention. Referring to FIG. 1, the area surrounded by broken lines is a control-apparatus-for-an-electric-railcar 100. In a filter capacitor 1 disposed to the DC side of the electric railcar control apparatus 100, its positive terminal connects, via a pantagraph 2 and a filter reactor 3, to an overhead line 4, with its negative terminal connecting via a wheel 5, to a rail 6, i.e., the ground. In FIG. 1, an AC rotating machine 7 and the wheel 5 are shown at positions spaced apart from each other; however, actually, the AC rotating machine 7 connects via a gear with the wheel 5. Here, the AC rotating machine 7 represents an induction machine or a synchronous machine.

The electric railcar control apparatus 100 includes the filter capacitor 1 that filters a DC voltage, an inverter 8, connected in parallel with the filter capacitor 1, that exchanges power with the AC rotating machine 7, a vector control unit 9 that controls so that the inverter 8 produces a desirable voltage vector in a rotation coordinate system, an overhead line voltage measuring instrument 10 that measures a voltage value of the overhead line 4, a voltage increase detection unit 11 that senses an amount of voltage increase Eser from an overhead line voltage Es to be measured with the overhead line voltage measuring instrument 10, and a correction torque command value calculation unit 12 that receives the amount of voltage increase Eser sensed at the voltage increase detection unit 11, to correct a torque command value PTR (varies according to the position of a notch—speed change gear on a driving cab of the electric railcar). A correction torque command value PTR1 to be delivered from a correction torque command value calculation unit 12 is input to the vector control unit 9. Here, although not shown in FIG. 1, there exists a control unit that operates with a time constant of several hundreds milliseconds in order to maintain a capacitor voltage EFC within a predetermined range.

Figure 2:
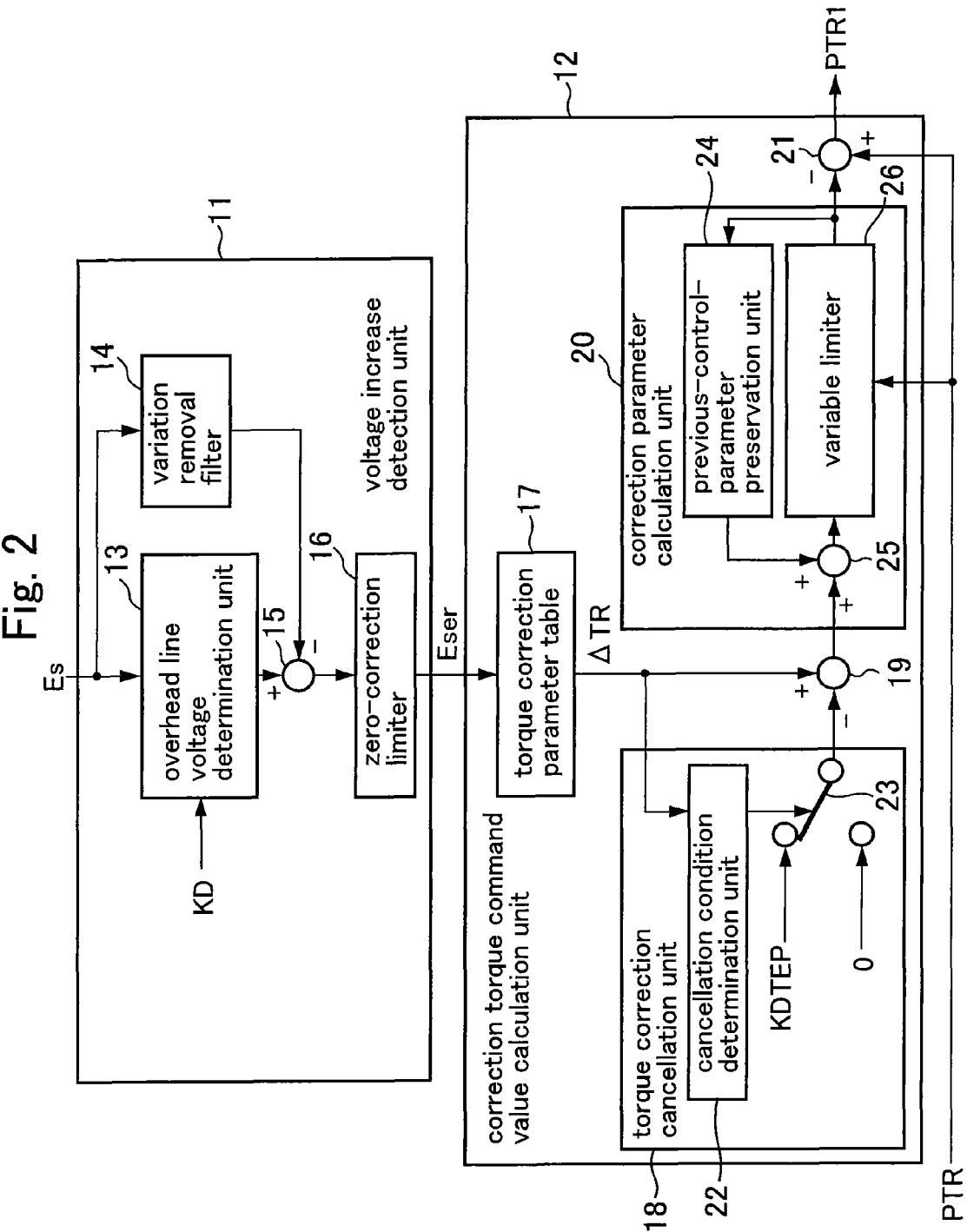
FIG. 2 is a schematic diagram illustrating an example of configurations of a voltage increase detection unit and a correction torque command value calculation unit in the control apparatus of the electric railcar according to Embodiment 1 of the present invention.

FIG. 2 shows a schematic diagram illustrating an example of internal configurations of the voltage increase detection unit 11 and the correction torque command value calculation unit 12. The voltage increase detection unit 11 includes an overhead line voltage determination unit 13 that produces the overhead line voltage Es when the overhead line voltage Es is larger than a predetermined reference voltage value KD, and, when it is not larger, produces the zero voltage, a variation removal filter 14 that produce an output voltage obtained by removing from the overhead line voltage Es a component of variation occurring at a rate higher than that by a predetermined time constant, a subtracter 15 that produces an output value obtained by removing a value output from the variation removal filter 14 from that from the overhead line voltage determination unit 13, and a zero correction limiter 16 that replace with zero an output value from the subtracter 15 when the output is less than zero. The output from the zero correction limiter 16 is the amount of voltage increase Eser which is ensured to be zero or more. Here, different configurations other than that of FIG. 2 may be employed if the amount of voltage increase Eser is produced only when the overhead line voltage Es is larger than the reference voltage value KD and the amount of voltage increase Eser is greater than zero.

The correction torque command value calculation unit 12 includes a torque correction parameter table 17 that is used to determine a torque correction parameter ΔTR according to the amount of voltage increase Eser; a torque correction cancellation unit 18 that uses, as an input, the torque correction parameter ΔTR and produces a correction value after cancellation in order to allow the correction torque command value PTR1 to smoothly vary in canceling correction; a subtracter 19 that subtracts a value output from the torque correction cancellation unit 18 from the torque correction parameter ΔTR; a correction parameter calculation unit 20 that receives a value output from the subtracter 19 and then calculates an amount of the torque correction parameter such that the overhead line voltage Es promptly coincide with a predetermined voltage target value; and the subtracter 19 that subtracts a value output from the correction parameter calculation unit 20 from the torque command value PTR. A value output from a subtracter 21 is the correction torque command value PTR1.

Figure 3:
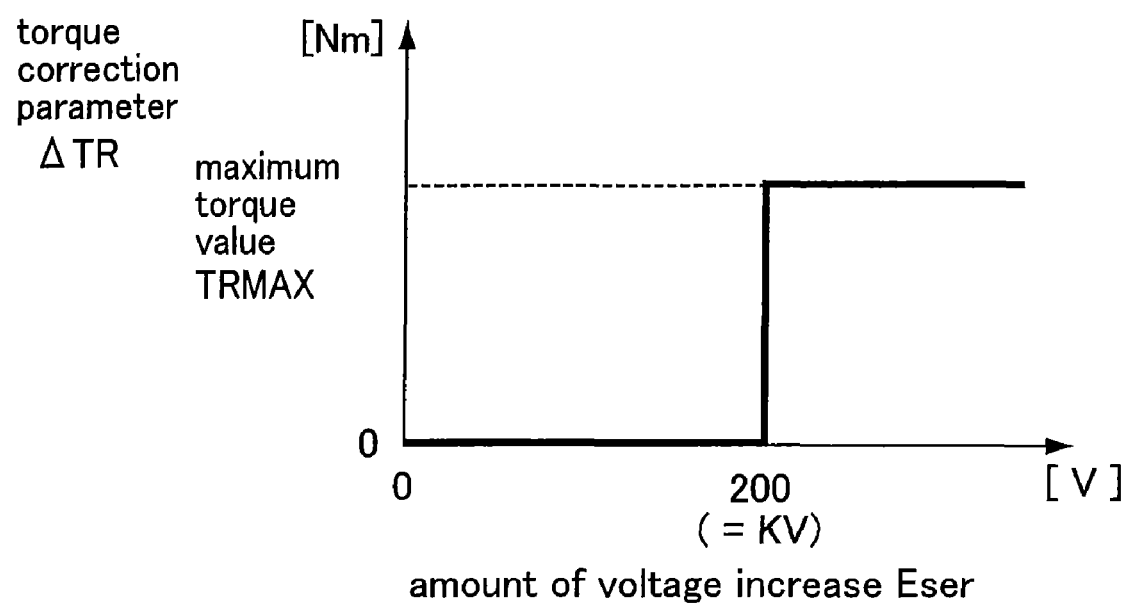
FIG. 3 is a graph illustrating a torque correction parameter table for determining a torque correction parameter according to the voltage increase in the control apparatus for the electric railcar according to Embodiment 1 of the present invention.

FIG. 3 is a graph illustrating a torque correction parameter table 17 that is used to determine the torque correction parameter ΔTR according to the amount of voltage increase Eser. When the amount of voltage increase Eser is within the predetermined range (represented as KV, 200V in FIG. 3), the torque correction parameter LTR stays zero; when the amount Eser is equal to or more than KV (200V), the parameter ΔTR stays constant at a maximum torque value (TRMAX) that the AC rotating machine 7 can produce. The predetermined range KV is determined to be a little smaller than a regular voltage increase range so that the amount of sharply increased voltage, occurring owing to a load drop, of the overhead line voltage Es is sensed without exception. The maximum value of the torque correction parameter ΔTR, although assumed to be a maximum torque value, may be a value smaller than the maximum torque value. The torque correction cancellation unit 18 includes the cancellation condition determination unit 22; and a switch 23 that, with determination results from the determination unit 22 serving as an input to the switch 23, switches between a predetermined positive value (KDTEP) and zero, to thereby produce either one as an output.

The correction parameter calculation unit 20, which varies an output value by a predetermined time step size (here, 500 micro-seconds), includes a previous-control-amount preservation unit 24 that preserves a previous output value, an adder 25 that sums together a value output from the subtracter 19 and an amount of the previous control stored by the previous-control-amount preservation unit 24, and a variable limiter 26 that limits the output from the adder 25, to a value of zero or more and of the torque command value PTR or less. The output from the variable limiter 26 is one from the correction parameter calculation unit 20. The time step size is appropriately determined by considering performance of a microcomputer or the like that performs control computation, or time resolution required in performing control. By providing the previous-control-amount preservation unit 24 and the adder 25, the calculation unit 20 integrates input data if the variable limiter 26 is disregarded. The reason for having an integral operation performed is mainly that when largely a torque correction is canceled, a gradual cancellation thereof is made.

Figure 4A:
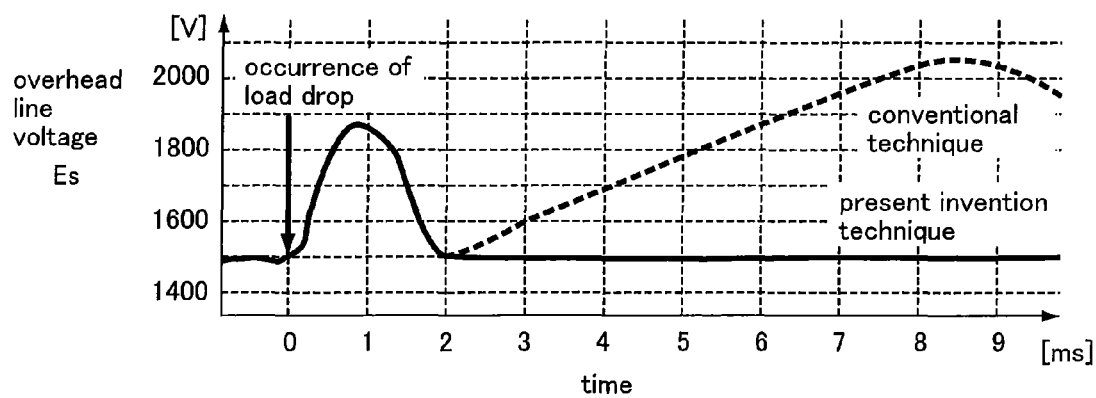
FIGS. 4(a), 4(b), and 4(c) are graphs illustrating variations of an overhead line voltage, a capacitor voltage and a correction torque command value, respectively, in situations where the load drop occurs in the regeneration operation in the control apparatus of the electric railcar according to Embodiment 1 of the present invention.
Figure 4B:
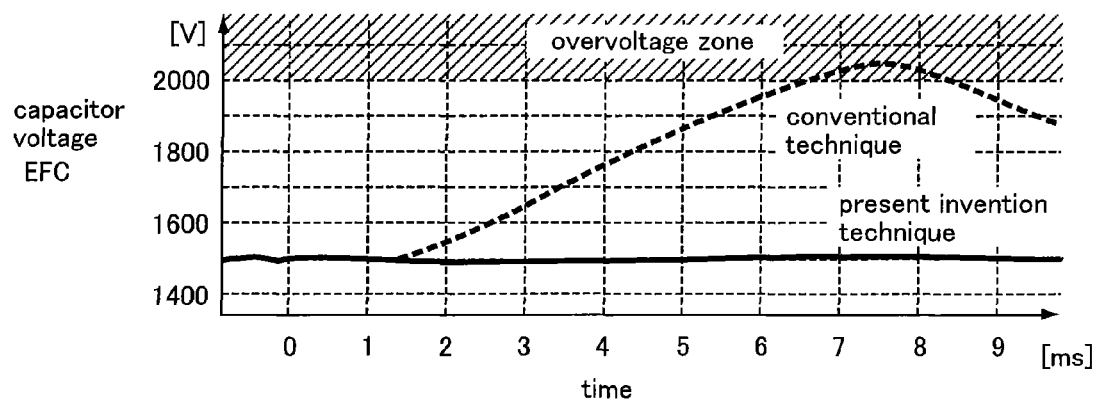
Figure 4C:
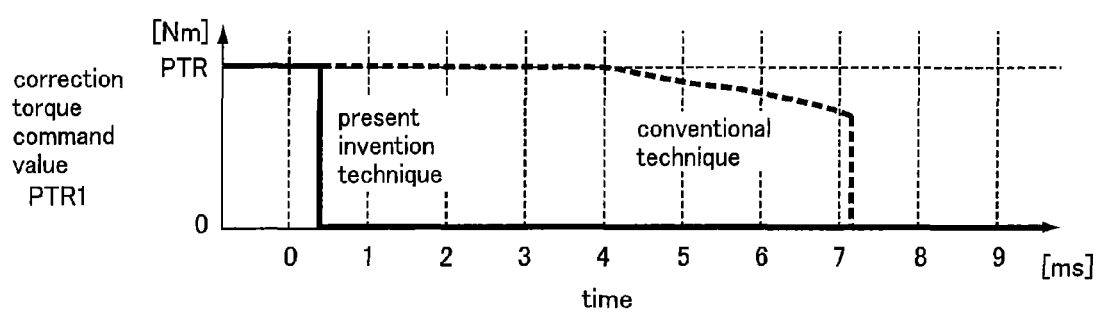

Next, the operation will be described below. In FIGS. 4(*a*) to 4(*c*), graphs are shown illustrating variations of the overhead line voltage Es, the capacitor voltage EFC and the correction torque command value PTR1 in situations where the load drop occurs in the regeneration operation. Solid lines indicates situations where the control according to the present invention is carried out, while broken lines indicates situations where the proportional integral control, as a conventional technique, is carried out for suppressing the capacitor voltage EFC within the predetermined range. Note that FIGS. 4(*a*) to 4(*c*) are imaginary graphs for illustrating the difference between the present invention and the conventional technique, and are not based on data from an experiment or a simulation.

When viewed from the electric railcar control apparatus 100 according to the present invention, another electric railcar 30 under its power operation is identified as a load connected to the overhead line 4. When the another electric railcar 30 abruptly stops its power operation, the load will be caused to drop off sharply, as viewed from the side of the electric railcar control apparatus 100; then, regeneration electric power that has been consumed by the another electric railcar 30 has nowhere else to go, which causes the voltage to sharply rise at the overhead line 4 and to immediately return to its value before the sharp increase. FIGS. 4(*a*) to 4(*c*) show on a time axis a time elapsing when the load drop has occurred. The probable cause of the load drop could be temporal abnormalities or the like to occur at the another electric railcar 30. In such situations, the abnormalities will be reset for a period of one second or so, which allows the another electric railcar to operate as the load that consumes the regeneration electric power. A situation where the overhead line voltage Es varies immediately after the load drop is shown in FIGS. 4(*a*) to 4(*c*)—i.e., with an overhead line rated at 1500 V, the voltage increases by about 200V or more during approximately one milliseconds, and after another one milliseconds or so elapses, the overhead line voltage returns to its original value. The inventor has found that such voltage behavior is exhibited. Here, while the overhead line voltage Es sharply varies, the capacitor voltage EFC hardly varies.

When the overhead line voltage Es goes beyond the reference voltage value KD, the correction torque command value PTR1 is zero; after a predetermined time (T1, approximately one second) the value PTR1 rises at a mild pace and comes to coincide with the torque command value PTR after a predetermined time T2 has elapsed, as will be described in greater detail. The time T2 becomes longer when the value PTR is large; however, it is limited to approximately one milliseconds at its maximum. During a period of T1+T2 having elapsed after detection of the load drop, the correction torque command value PTR1 becomes smaller than the torque command value PTR. For this reason, there is no sharp increase occurring in the capacitor voltage EFC after the regeneration electric power is stored. As shown in FIG. 4, variations of the capacitor voltage EFC and the overhead line voltage Es are small in magnitude, thus causing no deviation from the predetermined range.

In contrast, when a proportional integral control operation is performed in order to maintain the capacitor voltage EFC within a predetermined range, the voltage EFC will increase after the overhead line voltage Es has sharply varied, based on a rate to be determined by an amount of the regeneration electric power and capacitance of the filter capacitor 1. The rise of the voltage EFC brings about the rise of the voltage Es with a predetermined time delay. For normal capacitance of the filter capacitor 1, the rate of voltage increase of the voltage EFC is approximately 100 V per milliseconds when the amount of regeneration electric power is a maximum. After the capacitor voltage EFC has become more than an upper limit value (here assumed to be the same as the voltage reference value KD) of the predetermined range, a control operation starts suppressing the voltage EFC within a predetermined range, and in some situations the voltage EFC goes beyond an overvoltage determination value. FIG. 4 shows such a case, where an overvoltage protection device is activated, thereby causing regeneration torque to be zero.

Figure 5A:
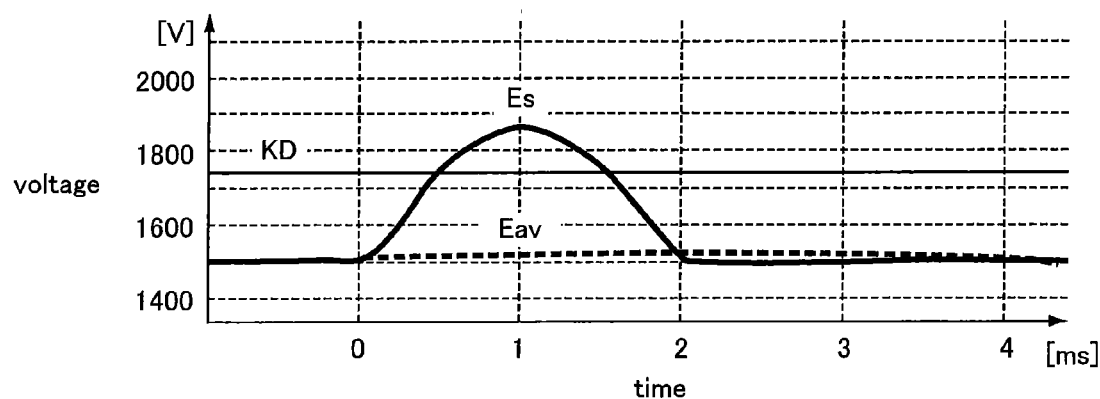
FIGS. 5(a) and 5(b) show the overhead line voltage and the amount of voltage increase, respectively.
Figure 5B:
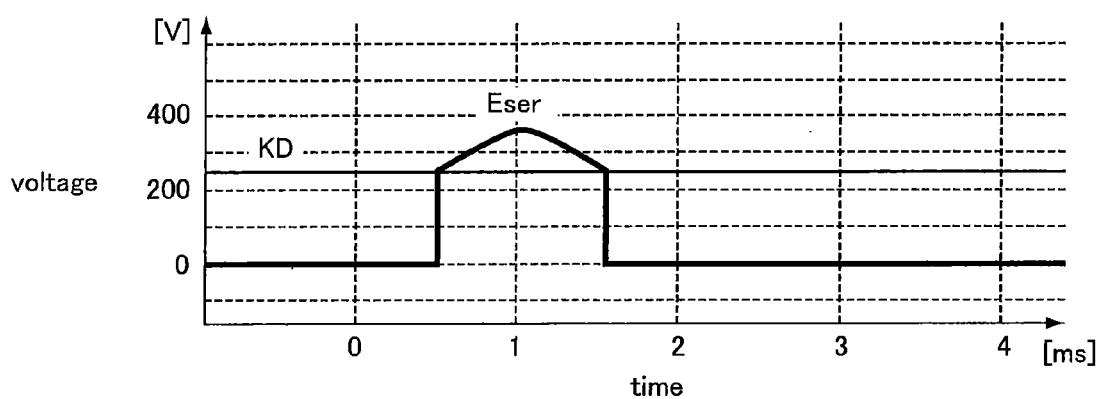

Operation of the electric railcar control apparatus 100 will be described in which the capacitor voltage EFC is caused not to deviate from the upper limit even if the load drop occurs in the regeneration operation. To begin with, the voltage increase detection unit 11 will be described. In FIG. 5, there is shown a relationship between the overhead line voltage Es and the increased amount of the voltage Eser, describing the operation of the voltage increase detection unit 11. Here, the variation removal filter 14 is assumed to produce as an output an average Eav of the voltage Es of past predetermined time (T3, one second in this case). As shown in FIG. 5, Eser is given as below.

$$\text{When } Es \leq MAX(KD, Eav), \text{ then } Eser=0 \qquad \text{Equation 1}$$

$$\text{When } Es > MAX(KD, Eav), \text{ then } Eser=Es-Eav \qquad \text{Equation 2}$$

Next, operation of the correction torque command value calculation unit 12 will be described. First, the calculation unit 12 refers to the torque correction parameter table 17 and then converts as shown below the increased amount of the voltage Eser into the torque correction parameter $\Delta TR$.

$$\text{When } Eser \geq KV, \text{ then } \Delta TR=TRMAX \qquad \text{Equation 3}$$

$$\text{When } Eser < KV, \text{ then } \Delta TR=0 \qquad \text{Equation 4}$$

For the case shown in FIG. 4, Equation 3 holds when the overhead line voltage Es goes beyond the reference voltage value KD and the increased amount of the voltage Eser is not zero; thus, after that time, the torque correction parameter $\Delta TR$ is equal to TRMAX.

While operation of the torque correction cancellation unit 18 will be described later, an output from the torque correction cancellation unit 18 is zero when the torque correction parameter $\Delta TR$ initially becomes equal to TRMAX, and $\Delta TR$ for an output from the subtracter 19 is equal to TRMAX. In the correction parameter calculation unit 20 that receives an output from the subtracter 19, at that time the previous output value preserved by the previous-control-amount preservation unit 24 is zero, and $\Delta TR$ for an output from the adder 25 is equal to TRMAX. By the variable limiter 26 the output from the adder 25 is limited to the torque command value PTR, which is equal to or smaller than the maximum torque value TRMAX. In this way, the calculation unit 20 produces PTR as an output, with this value being stored in the previous-control-amount preservation unit 24. Then, the correction torque command value PTR1, which is an output from the subtracter 21, becomes zero. Here, the correction torque command value PTR1 is corrected so as to become zero; however, the value PTR1, if small enough not to cause the capacitor voltage EFC to sharply rise, may not be zero. Thereafter, as long as a value of zero or more is input to the calculation unit 20, the calculation unit 20 continues to output the PTR because the previous-control-amount preservation unit 24 preserves the PTR, while the correction torque command value PTR1 maintains its zero output state.

After the voltage increase detection unit 11 senses that the increased amount of the voltage Eser is equal to zero, $\Delta TR$ becomes equal to zero, and the output from the subtracter 19 is an inversion of the sign of an output from the torque correction cancellation unit 18. The torque correction cancellation unit 18 determines that the cancellation condition determination unit 22 should cancel the torque correction in such a way as will be described later, and then the switch 23 delivers the predetermined value (KDTEP). Then, the correction parameter calculation unit 20 receives-KDTEP as an input, the output from the calculation unit 20 decreases by only KDTEP for each time step size from the PTR, and the correction torque command value PTR1 progressively increases from zero at a predetermined rate of variation.

Here, operation of the cancellation condition determination unit 22 will be described. The determination unit 22, which receives the torque correction parameter $\Delta TR$ as an input, determines that the torque correction should be canceled when a state in which the parameter $\Delta TR$ being zero continues for equal to or longer than the predetermined time T1, and determines that the torque correction should not be canceled in the other states. The switch 23 delivers KDTEP when the cancellation condition determination unit 22 determines cancellation and delivers zero when in non-cancellation. Since the previous-control-amount preservation unit 24 stores PTR, the correction parameter calculation unit 20 outputs PTR while the torque correction cancellation unit 18 delivers a zero output.

With the electric railcar control apparatus 100 operating in this way, the regeneration torque command value is reduced for the predetermined time (T1+T2) elapsing after the load drop has been detected in the regeneration operation, whereby the capacitor voltage EFC can be controlled so as not to deviate from the upper limit. When, while the correction torque command value PTR1 is corrected to zero, the abnormalities of the another electric railcar 30 is canceled and then the electric power consumption is the same as that before the load drop, the torque command value PTR after the load drop becomes the same value before the load drop. When a situation changes from that before the load drop—such as a situation where such abnormalities of the electric railcar 30 remains uncanceled, or a still another electric railcar becomes to additionally consume electric power—the torque command value PTR after the load drop may in some cases differ from the value before the load drop.

Although an average voltage for the past predetermined time is used for the variation removal filter 14, a low-pass filter or the like may be employed. Any type of filter is acceptable which can remove a component of variation at a rate higher than that by a predetermined time constant that is defined from a predetermined lower-limit of voltage increase rate used for determining whether a voltage increase occurs.

Figure 6:
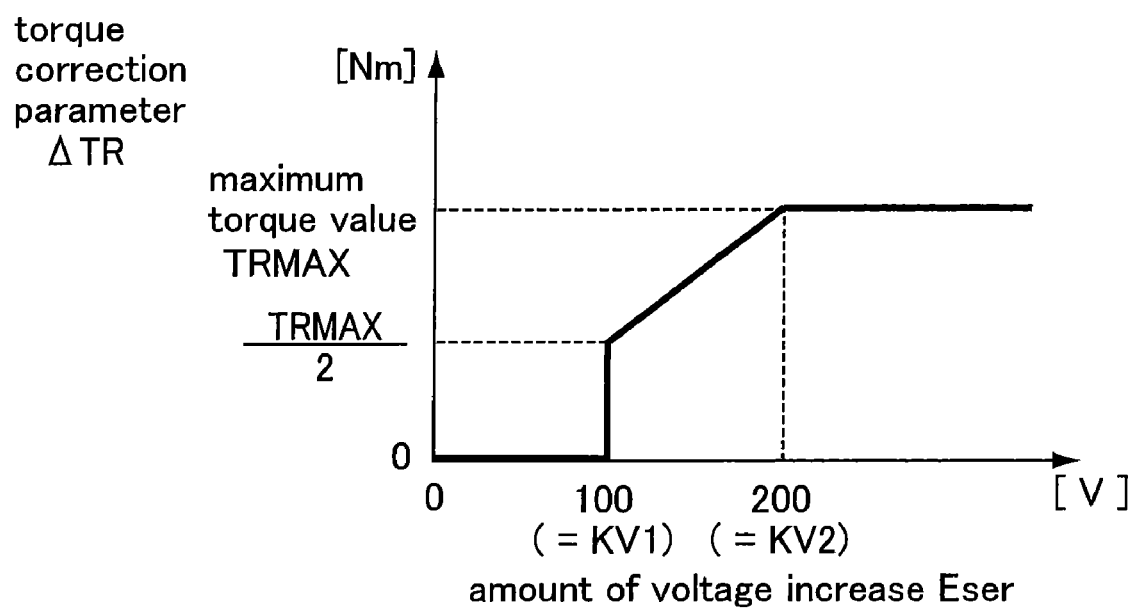
FIG. 6 is a graph illustrating another example of a torque correction parameter table for determining a torque correction parameter according to the voltage increase in the control apparatus of the electric railcar according to Embodiment 1 of the present invention.

The torque correction parameter table 17 may be one other than indicated in FIG. 3. For instance, FIG. 6 is a view illustrating another example of the torque correction parameter table 17. Referring to FIG. 6, the amount of voltage increase Eser is categorized into a first predetermined range (KV1, here 100V) and a second predetermined range (KV2, here 200V), and the amount of torque correction ΔTR is calculated by the following equations.

When Eser≧KV2, then ΔTR=TRMAX     Equation 5

When $KV2>Eser≧KV1$, then $ΔTR=TRMAX×(½+(KV2-Eser)/(2×(KV2-KV1)))$     Equation 6

When Eser<KV1, then ΔTR=0     Equation 7

According to the torque correction parameter table 17 in FIG. 6, the capacitor voltage EFC can be controlled not to deviate from the upper limit against a smaller load drop as well. Another table other than the torque correction parameter table 17 indicated in FIG. 3 or FIG. 6 may be used if the torque correction parameter ΔTR becomes zero for a voltage increase not due to the load drop or for a voltage increase, even with the load drop involved, to cause only a small voltage variation, and if at least a necessary amount of the torque correction parameter ΔTR can be output for a load drop that brings about a voltage variation equal to or more than a predetermined magnitude.

The correction torque command value calculation unit 12 does not need to be one of a configuration shown in FIG. 2 and may be of any configuration in which the torque correction parameter can be reduced during a predetermined time having elapsed from when the voltage increase detection unit 11 senses an amount of voltage increase equal to or more than a predetermined range. Although the configuration has been used in which the correction torque amount ΔTR is varied for each time step size, another configuration may be used in which the amount ΔTR is varied continuously with respect to time. What is stated above holds for the subsequent embodiments as well.

Embodiment 2

Figure 7:
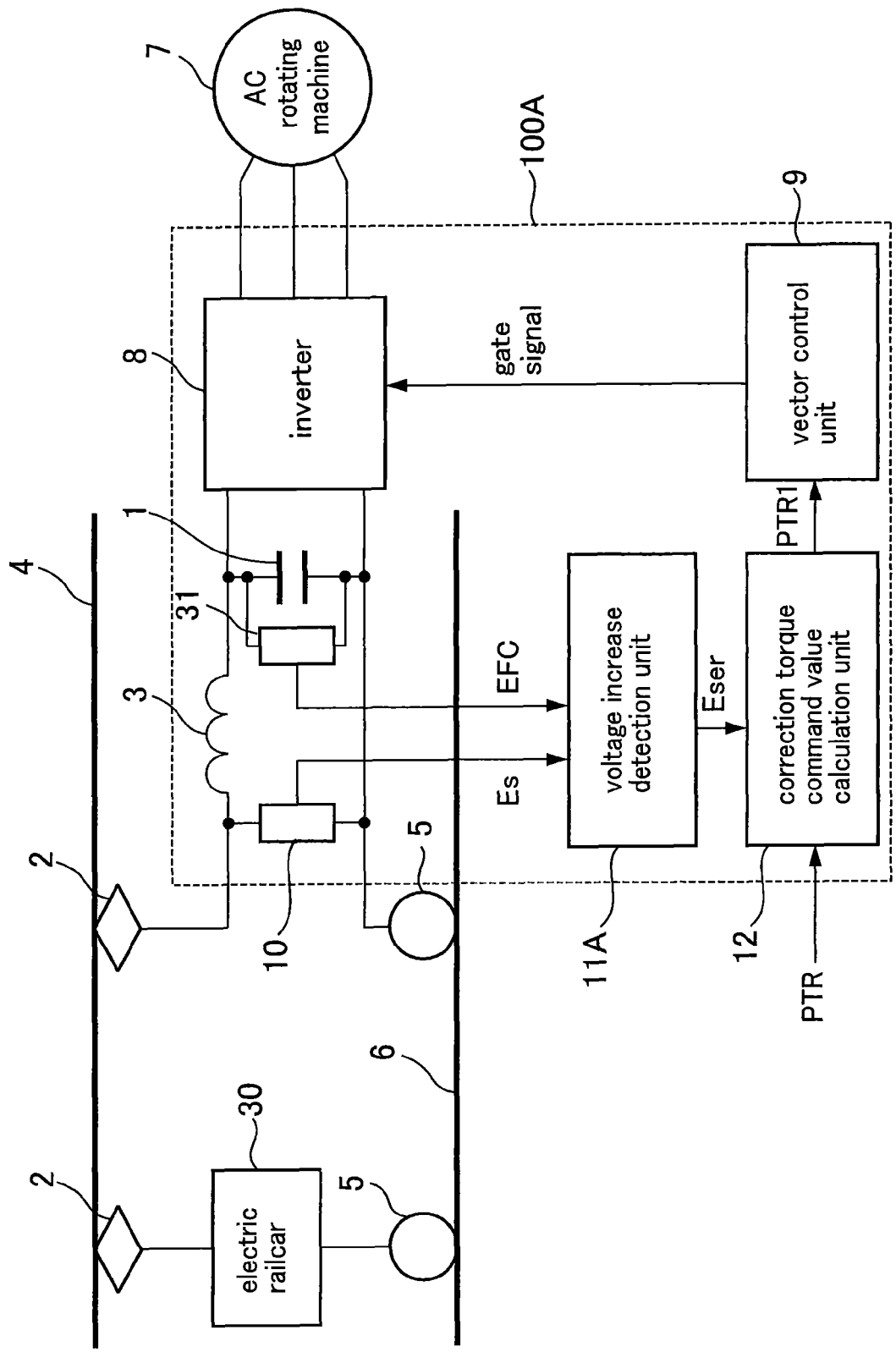
FIG. 7 is a schematic diagram illustrating an example of a configuration of a control apparatus of an electric railcar according to Embodiment 2, Embodiment 4 and Embodiment 8 of the present invention.
Figure 8:
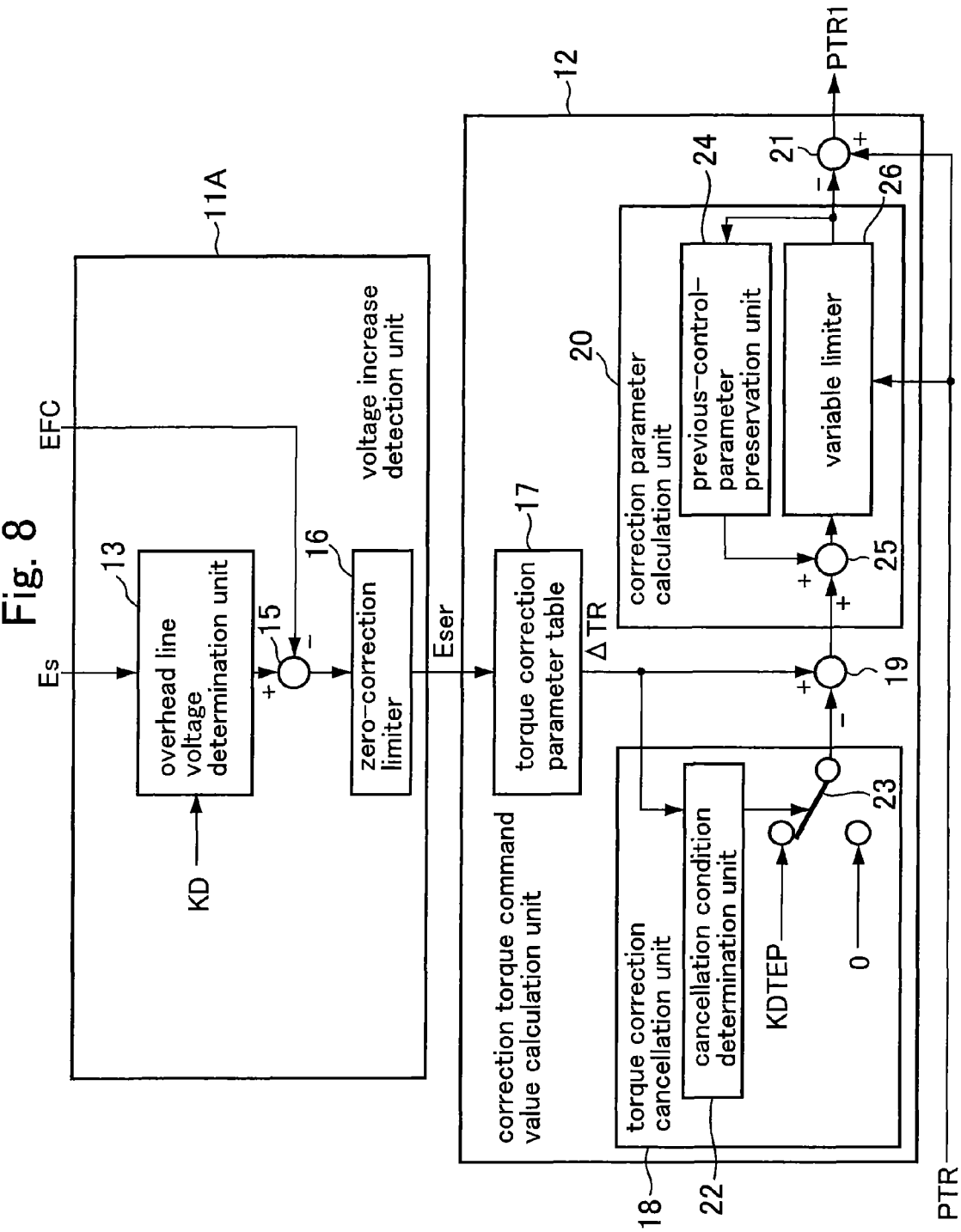
FIG. 8 is a schematic diagram illustrating an example of configurations of a voltage increase detection unit and a correction torque command value calculation unit according to Embodiment 2 of the present invention.

Embodiment 2 is an embodiment as changed from Embodiment 1 so that the capacitor voltage EFC is used in place of an output voltage of the variation removal filter 14. In FIG. 7, a schematic diagram is shown illustrating an example of a configuration of a control apparatus for an electric railcar according to Embodiment 2 of the present invention. FIG. 8 is a schematic diagram illustrating an example of configurations of a voltage increase detection unit and a correction torque command value calculation unit according to Embodiment 2 of the present invention.

Only differences from Embodiment 1 will be described. In FIG. 7, a control apparatus 100A for an electric railcar is additionally provided with a capacitor voltage measuring instrument 31 that measures a voltage across the filter capacitor 1, and the capacitor voltage EFC measured using the capacitor voltage measuring instrument 31 is supplied to a voltage increase detection unit 11A. In FIG. 8, a voltage increase detection unit 11A has no variation removal filter 14, and the capacitor voltage EFC is supplied to the subtracter 15. The reason for so doing is that immediately after the load drop occurs in the regeneration operation as in the foregoing description, the capacitor voltage EFC does not much vary although the overhead line voltage Es sharply varies, and thus, a difference between the capacitor voltage EFC and the voltage Es can be monitored as a voltage variation.

The apparatus according to Embodiment 2 operates as with that according to Embodiment 1. During a predetermined time having elapsed after the detection of the load drop in the regeneration operation, the reduction of torque command value in regeneration can control the capacitor voltage EFC so as not to deviate from the upper limit. Implementation of the variation removal filter 14 using a hardware module results in reduction of component count, thus leading to cost reduction. In implementation of the filter 14 using a software module, a computation load in a microcomputer or the like can be reduced by decreasing a control calculation volume, and software development costs for the variation removal filter 14 are unneeded as well, which leads to cost reduction.

Embodiment 3

Figure 9:
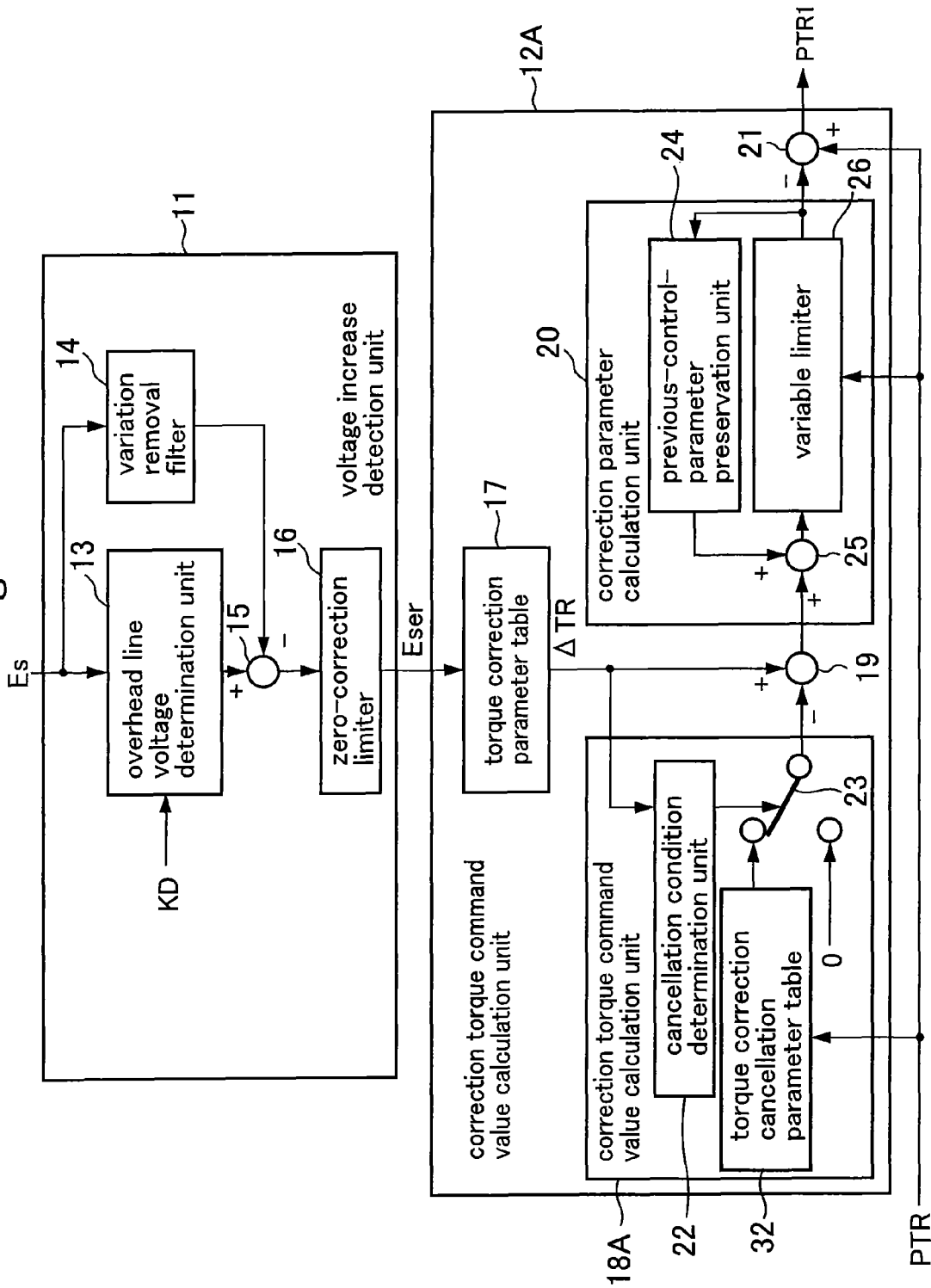
FIG. 9 is a schematic diagram illustrating an example of configurations of a voltage increase detection unit and a correction torque command value calculation unit according to Embodiment 3 of the present invention.

Embodiment 3 is a variation of Embodiment 1, in which a rate of variation of the correction amount in canceling the torque correction is made so as to vary based on the magnitude of the torque command value PTR. FIG. 9 is a schematic diagram illustrating an example of configurations of a voltage increase detection unit and a correction torque command value calculation unit according to Embodiment 3 of the present invention. Note that a configuration of the control apparatus for the electric railcar is the same as that in Embodiment 1.

Figure 10:
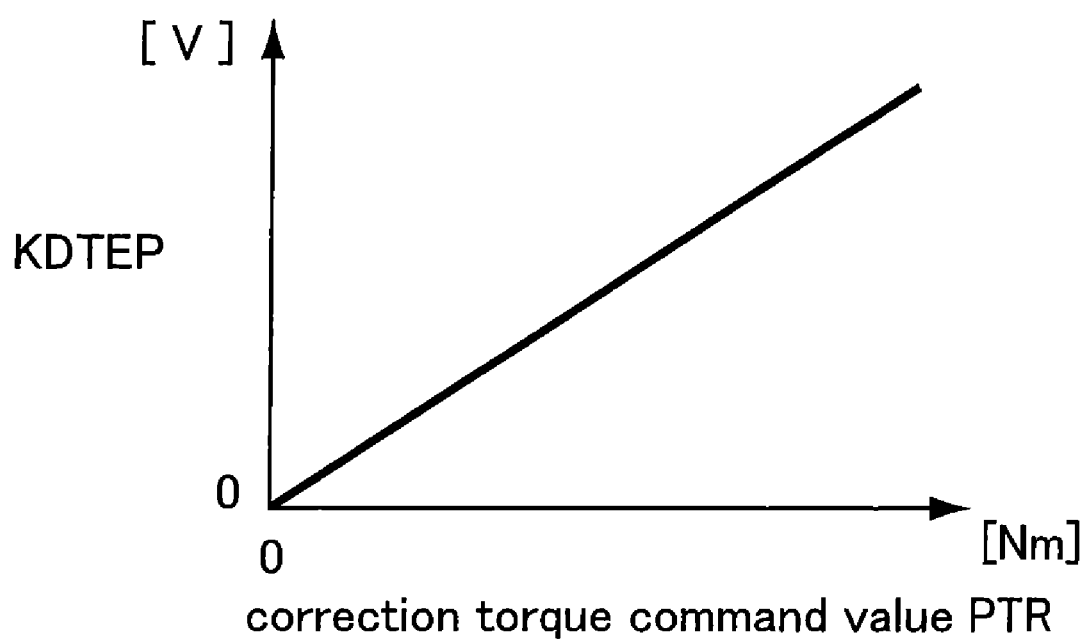
FIG. 10 is a graph illustrating an example of a torque correction parameter cancellation table according to Embodiment 3 of the present invention.

Comparison of FIG. 9 with FIG. 2 in Embodiment 1 reveals a difference—a torque-correction-cancellation parameter table 32 is added to a torque correction cancellation unit 18A included in the correction torque command value calculation unit 12A. FIG. 10 shows an example of the torque-correction-cancellation parameter table 32. The parameter table 32 shown in FIG. 10 produces as an output a predetermined value KDTEP proportional to the torque command value PTR.

An apparatus according to Embodiment 3 operates in a fashion substantially similar to that according to Embodiment 1. The capacitor voltage EFC is controlled so as not to deviate from the upper limit, by reducing a torque command value of the regeneration during a predetermined time elapsing after a load drop has been detected in regeneration operation.

A difference in operation between Embodiment 1 and this embodiment is that in Embodiment 1, a rate of variation of a correction amount in canceling the torque correction is, regardless of the torque command value PTR, constant at the predetermined value KDTEP, while in Embodiment 3 the rate of variation in the correction amount is in proportion to the torque command value PTR. For this reason, a time required until cancellation of the torque correction in Embodiment 1 is longer as the torque command value PTR becomes large, whereas the time in Embodiment 3 is the same value regardless of the torque command value PTR. When the time required to cancel the torque correction is short, the AC rotating machine will promptly return to its regeneration operation, thus minimizing reduction in the regeneration rate resulting from performing the torque correction. For the torque-correction-cancellation parameter table 32, if the predetermined value KDTEP increases as the torque command value increases, a similar advantageous effect is achieved even if KDTEP is not in a proportional relationship with PTR.

Embodiment 4

Figure 11:
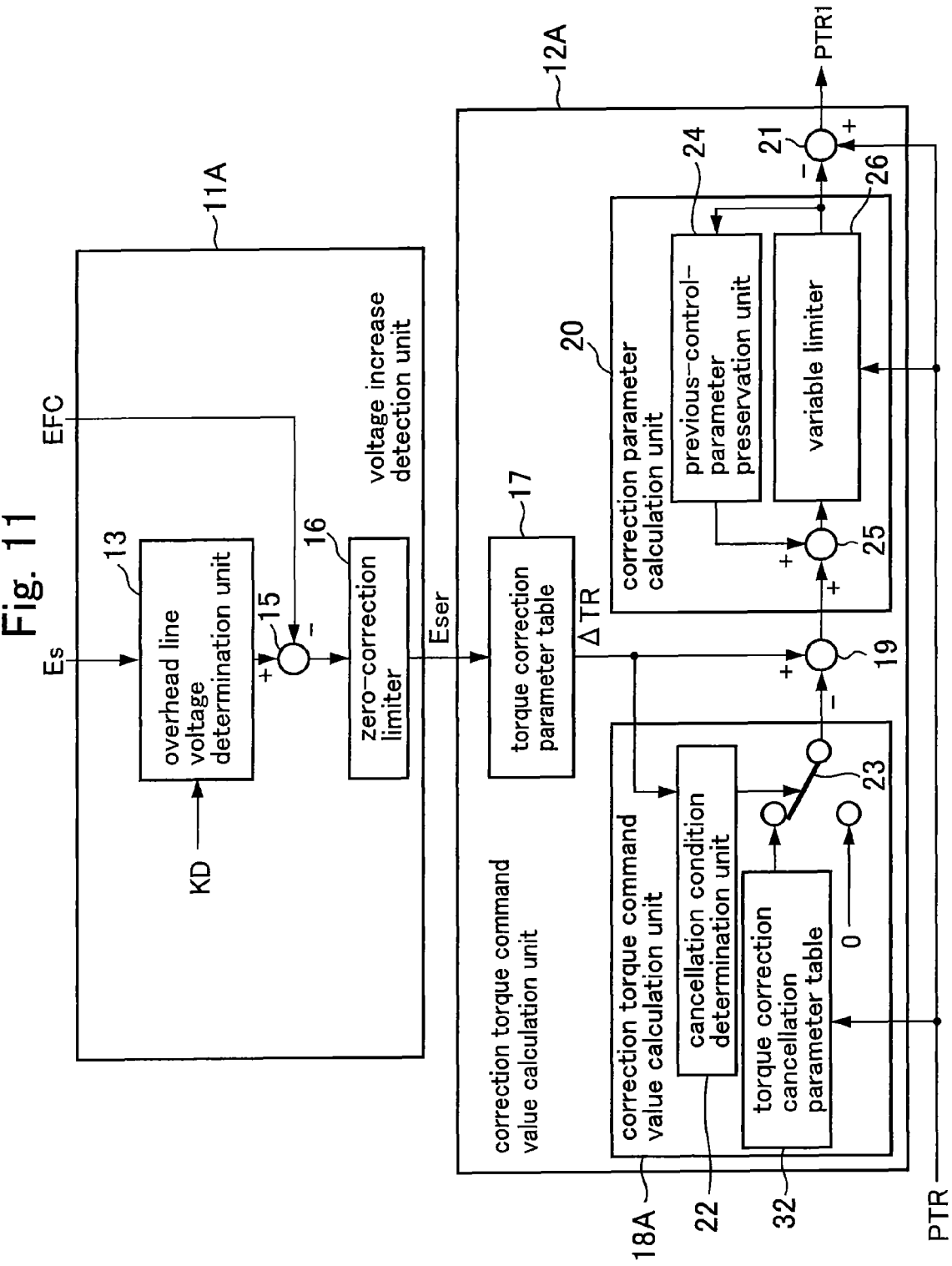
FIG. 11 is a schematic diagram illustrating an example of configurations of a voltage increase detection unit and a correction torque command value calculation unit according to Embodiment 4 of the present invention.

Embodiment 4 is a variation of Embodiment 2, in which a rate of variation of the correction amount in canceling the torque correction is made so as to vary based on the magnitude of torque command value PTR. FIG. 11 is a schematic diagram illustrating an example of configurations of a voltage increase detection unit and a correction torque command value calculation unit according to Embodiment 4 of the present invention. Note that a configuration of the control apparatus for the electric railcar is the same as that shown in FIG. 7 according to Embodiment 2.

Comparison of FIG. 11 with FIG. 8 according to Embodiment 2 reveals a difference—a torque correction cancellation unit 18A included in a correction torque command value calculation unit 12A is additionally provided with the torque-correction-cancellation parameter table 32. The parameter table 32, which is the same one as in Embodiment 3, produces as an output the predetermined value KDTEP in proportional to the torque command value PTR. The apparatus according to Embodiment 4 also operates as with that in Embodiment 3, thus providing a similar advantageous effect.

Embodiment 5

Figure 12:
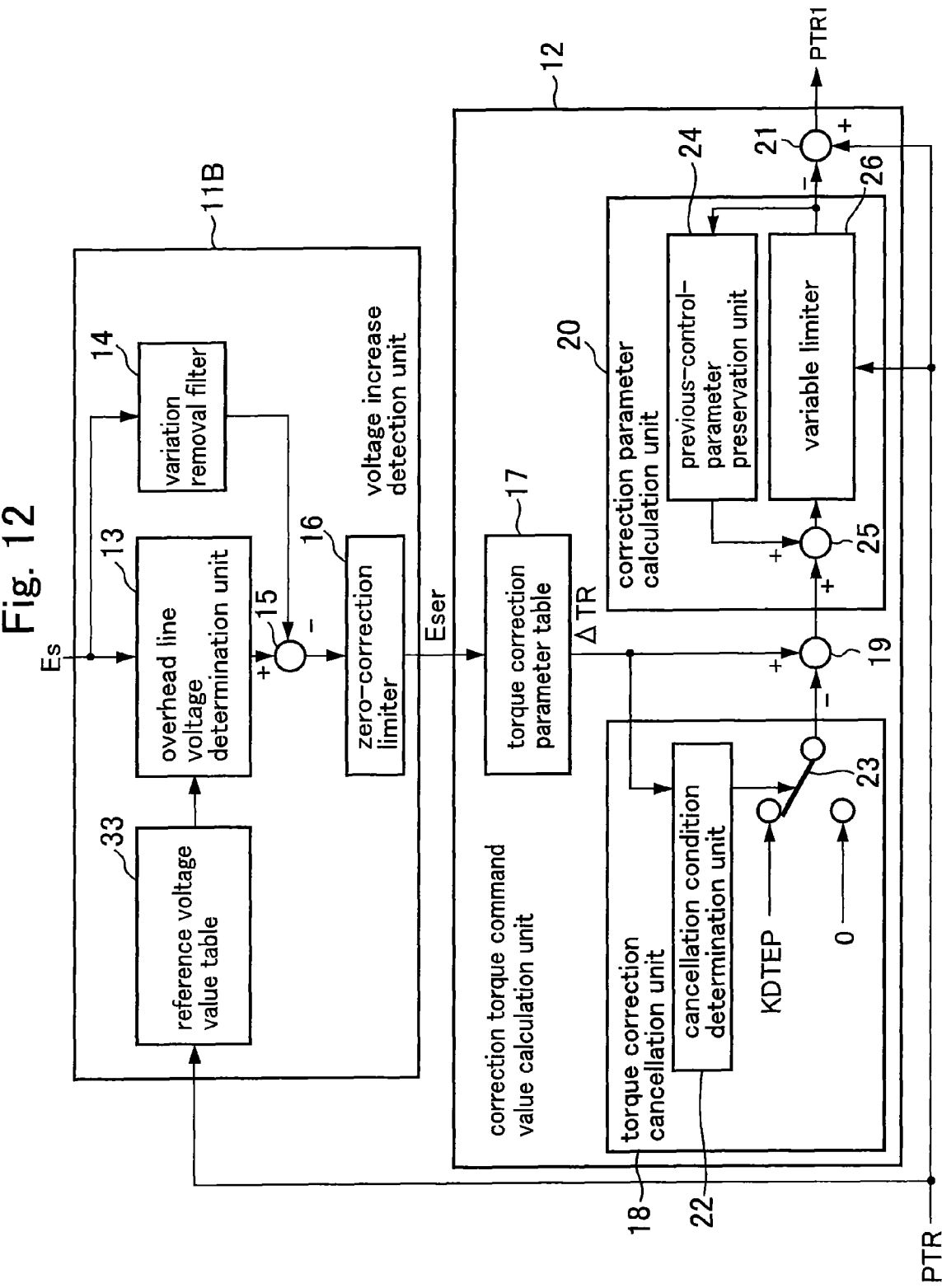
FIG. 12 is a schematic diagram illustrating an example of configurations of a voltage increase detection unit and a correction torque command value calculation unit according to Embodiment 5 of the present invention.

Embodiment 5 is a variation of Embodiment 1, in which the reference voltage value KD for determining an amount of voltage increase is made to vary based on the magnitude of torque command value PTR. FIG. 12 is a schematic diagram illustrating an example of configurations of a voltage increase detection unit and a correction torque command value calculation unit according to Embodiment 5 of the present invention 5. Note that a configuration of the control apparatus for the electric railcar is the same as that in FIG. 1 according to Embodiment 1.

Figure 13:
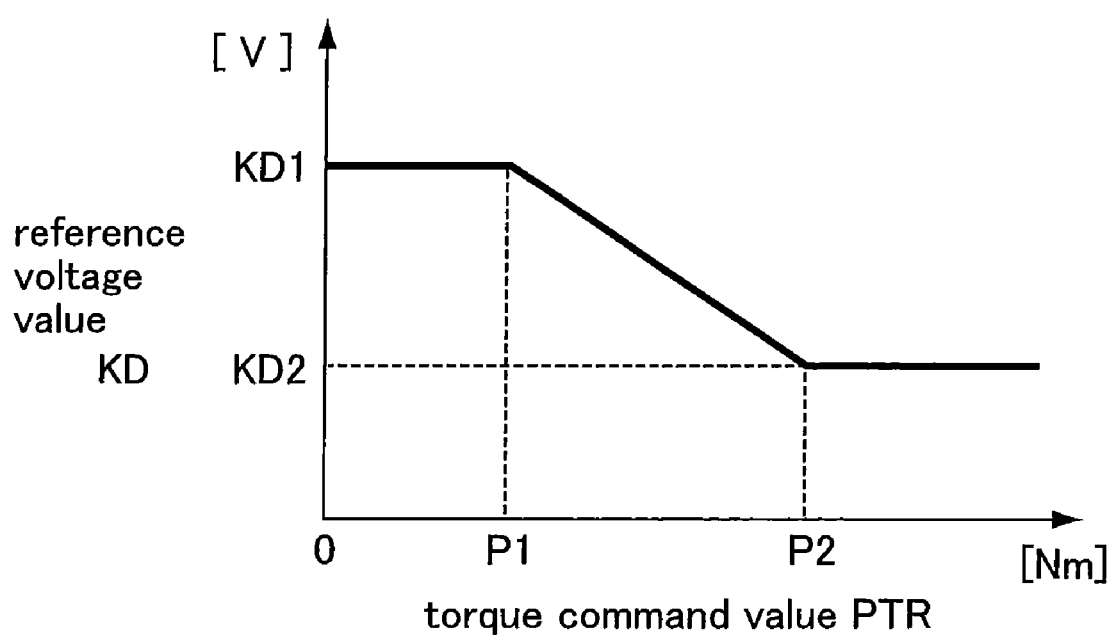
FIG. 13 is a graph illustrating an example of a reference voltage value table according to Embodiment 5 of the present invention.

Comparison of FIG. 12 with FIG. 2 according to Embodiment 1 reveals a difference—a voltage increase detection unit 11B is additionally provided with a reference voltage value table 33. The value table 33 produces as an output the reference voltage value KD that varies according to the torque command value PTR. FIG. 13 shows an example of the value table 33. In FIG. 13, the value KD for the torque command value PTR will be delivered as described below.

When PTR≦P1, then KD=KD1  Equation 7

When $P1 < PTR < P2$, then $KD = KD1 + ((KD2-KD1)/(P2-P1)) \times (PTR-P1)$  Equation 8

When P2≦KV1, then KD=KD2  Equation 9 where KD1 is greater than KD2, and the reference voltage value KD—a reference used for determining the voltage increase of the overhead line voltage Es when the torque command value PTR is small—is made larger than the torque command value PTR that is at a large side. The reason for so doing is that since the torque command value PTR is small and thus the rate of increase of the capacitor voltage EFC is low even if the regeneration is maintained at occurrence of the load drop, there is less possibility for the capacitor voltage EFC to be in an overvoltage condition. With this arrangement, reduction in the torque command value of the AC rotating machine in the regeneration operation becomes less frequent, which provides an advantageous effect in that reduction of the regeneration rate is made small.

The apparatus according to Embodiment 5 also operates as with that according to Embodiment 1 when the torque command value PTR is large, while, when the torque command value PTR is small, a torque command value is reduced only for a voltage increase of a value equal to or larger than the reference voltage value KD that is higher than a large value PTR. For that reason, by reducing, during a predetermined time having elapsed after detection of the load drop, the regeneration torque command value only when there is a greater possibility for the load drop in the regeneration operation to cause an overvoltage in the capacitor voltage EFC, the reduction of regeneration rate can be made smaller while controlling the capacitor voltage EFC so as not to deviate from the upper limit.

Embodiment 6

Figure 14:
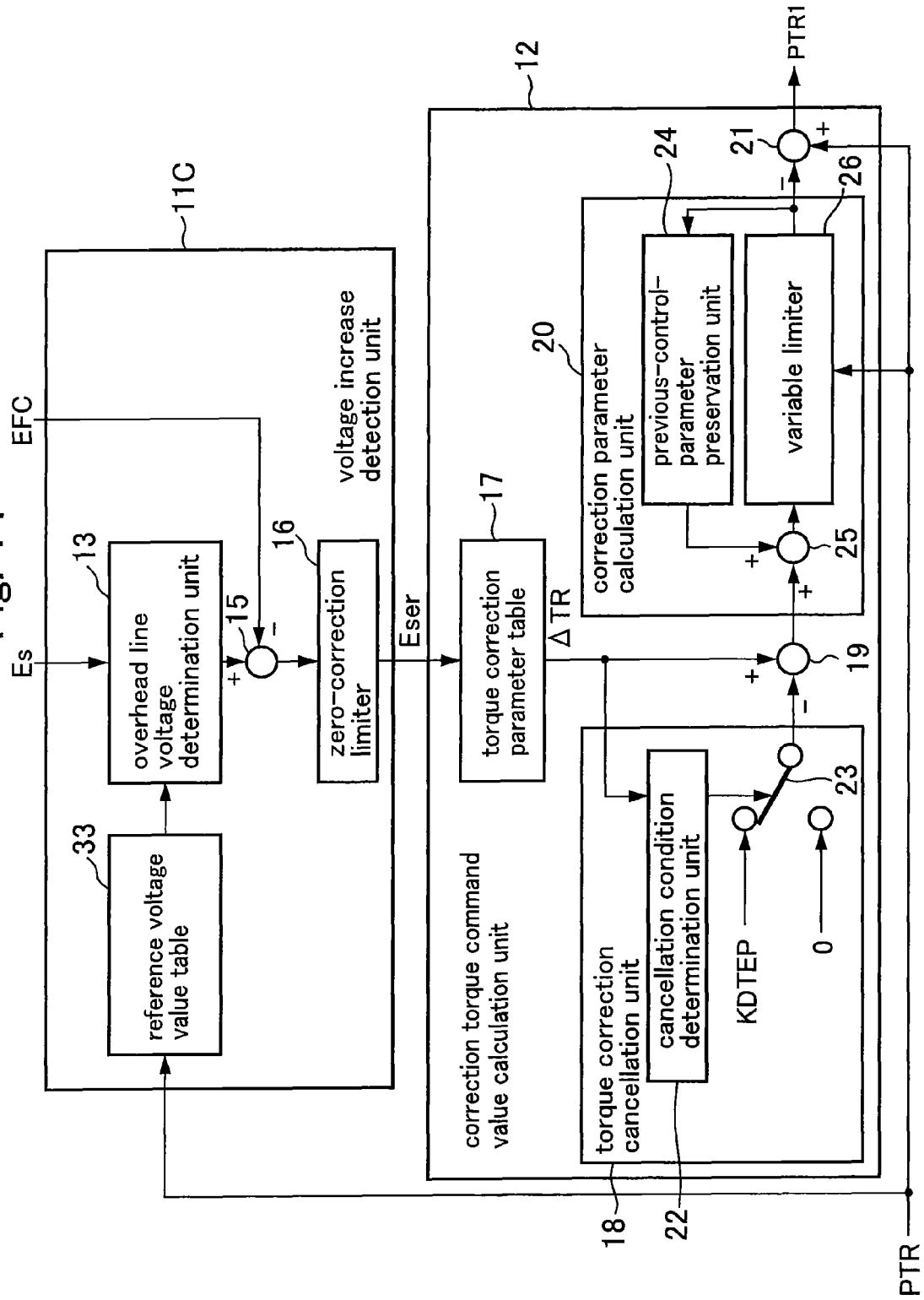
FIG. 14 is a schematic diagram illustrating an example of configurations of a voltage increase detection unit and a correction torque command value calculation unit according to Embodiment 6 of the present invention.

Embodiment 6 is a variation of Embodiment 2, in which the reference voltage value KD for determining the voltage increase is made so as to vary based on the magnitude of torque command value PTR. FIG. 14 is a schematic diagram illustrating an example of configurations of a voltage increase detection unit and a correction torque command value calculation unit according to Embodiment 6 of the present invention. Here, a configuration of the control apparatus for the electric railcar is the same as that of FIG. 7 according to Embodiment 2.

Comparison of FIG. 14 with FIG. 18 according to Embodiment 1 reveals a difference—a difference is that a voltage increase detection unit 11C is additionally provided with the reference voltage value table 33. The reference voltage value table 33 is similar to that according to Embodiment 5; as shown in FIG. 13, the reference voltage value KD is produced with respect to the torque command value PTR. The apparatus according to Embodiment 6 also operates as with that according to Embodiment 5, providing an advantageous effect similar to that of Embodiment 5.

Embodiment 7

Figure 15:
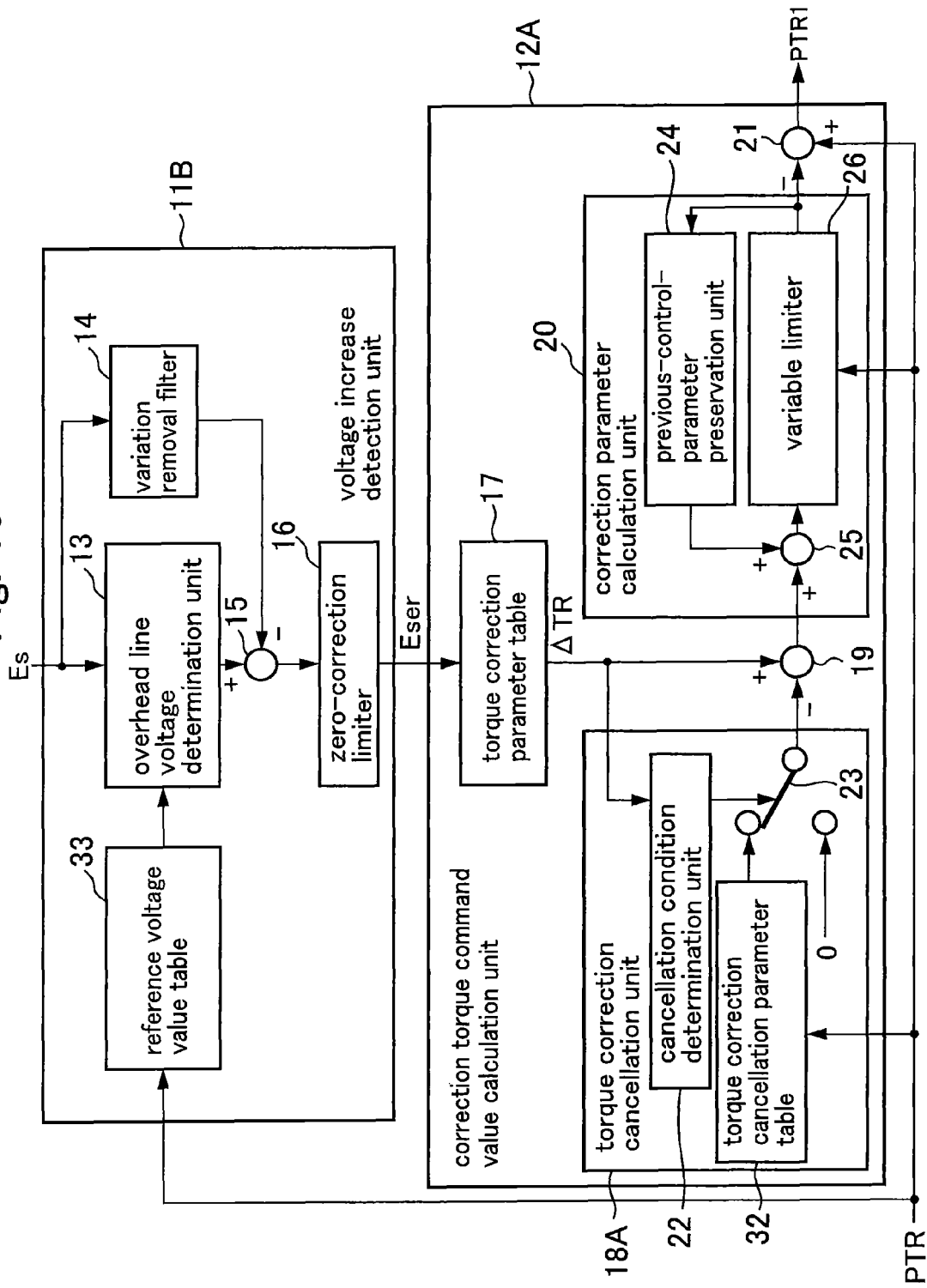
FIG. 15 is a schematic diagram illustrating an example of configurations of a voltage increase detection unit and a correction torque command value calculation unit according to Embodiment 7 of the present invention.

Embodiment 7 is a variation of Embodiment 1, in which Embodiment 7 is intended to include the features of both Embodiment 5 and Embodiment 3. FIG. 15 is a schematic diagram illustrating an example of configurations of a voltage increase detection unit and a correction torque command value calculation unit, according to Embodiment 7 of the present invention. Here, a configuration of the control apparatus for the electric railcar is the same as that in FIG. 1 according to Embodiment 1.

In Embodiment 7, the apparatus operates as with that according to Embodiment 5 until the torque command value PTR is reduced, and when the reduced torque command value PTR is restored to its original value, the apparatus operates as with that according to Embodiment 3. Consequently, the apparatus according to Embodiment 7 provides advantageous effects similar to those according to both Embodiment 3 and Embodiment 5.

Embodiment 8

Figure 16:
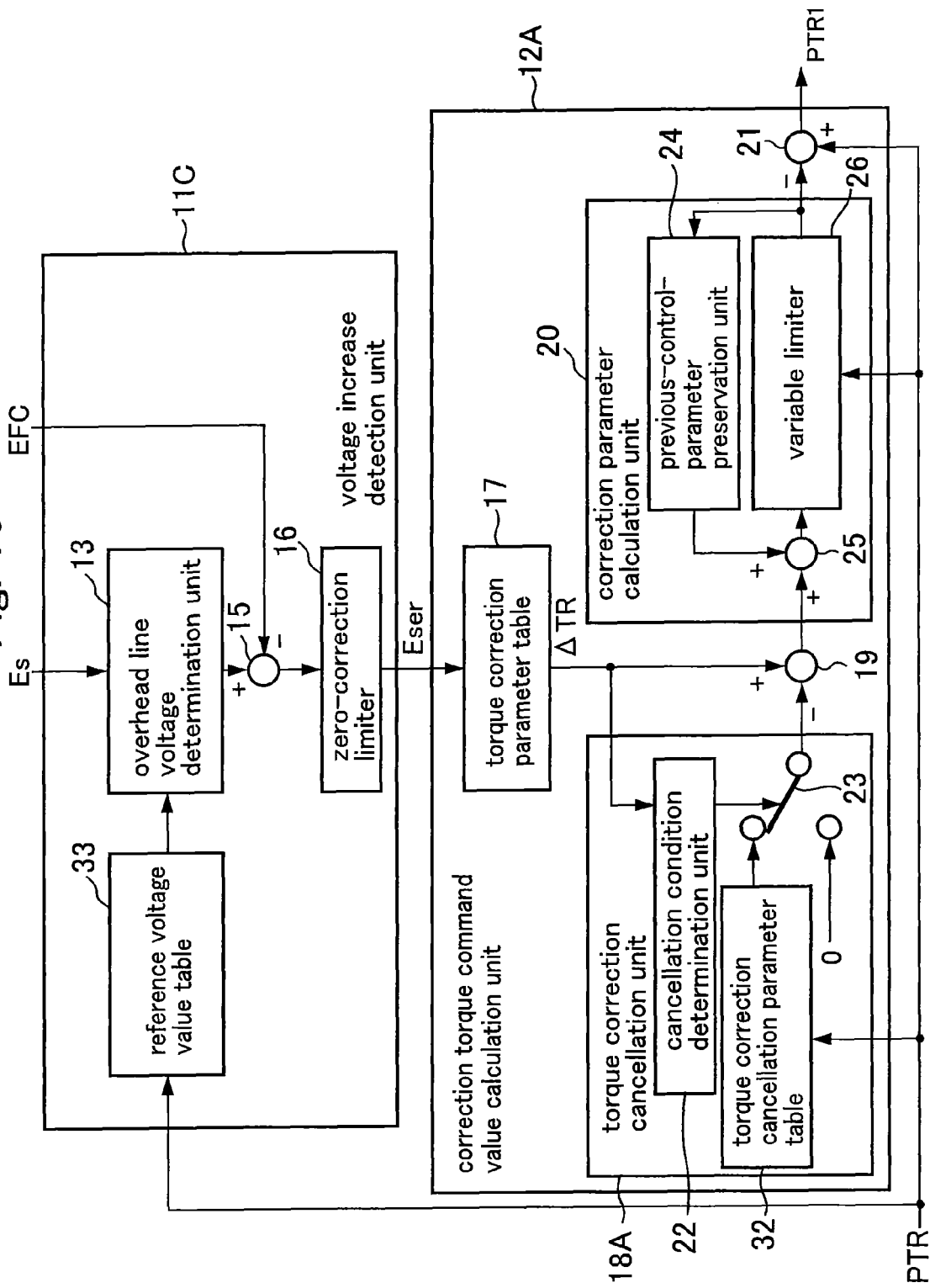
FIG. 16 is a schematic diagram illustrating an example of configurations of a voltage increase detection unit and a correction torque command value calculation unit according to Embodiment 8 of the present invention.

Embodiment 8 is a variation of Embodiment 2, in which Embodiment 8 is intended to include the features of both Embodiment 5 and Embodiment 3. FIG. 16 is a schematic diagram illustrating an example of configurations of a voltage increase detection unit and a correction torque command value calculation unit according to Embodiment 8 of the present invention. Here, a configuration of the control apparatus for the electric railcar is the same as that of FIG. 7, Embodiment 2. The units according to Embodiment 7 operate as with those according to Embodiment 6, providing an advantageous effect similar to that of Embodiment 6.

While the present invention has shown and described with respect to exemplary embodiments thereof and can be combined with a technique known in the art, it will be understood by those skilled in the art that various changes, modification, omission and the like may be made without departing from the spirit and scope of the invention.

What is claimed is:
1. A control apparatus for an electric railcar, comprising:
   an inverter that exchanges power between the inverter and an alternating-current rotating machine;
   a filter capacitor connected in parallel to a direct-current side of the inverter;
   a filter reactor provided between the filter capacitor and an overhead line;

an overhead line voltage measuring instrument that measures an overhead line voltage;

a voltage increase detection unit to which the overhead line voltage measured using the overhead line voltage measuring instrument is supplied, the voltage increase detection unit sensing an amount of voltage increase occurring when the overhead line voltage goes beyond a reference voltage value and rises as varying at a rate equal to or higher than that by a predetermined time constant that is shorter than a time constant of the filter reactor and the filter capacitor;

a correction torque command value calculation unit that calculates a correction torque command value that is corrected so that a torque command value to be received from an external unit is made smaller for a predetermined time elapsing after the voltage increase detection unit has sensed an amount of voltage increase of a predetermined range or more during regeneration operation of the inverter; and a vector control unit that controls the inverter so that the alternating current rotating machine develops torque coincident with the correction torque command value.

2. The control apparatus for an electric railcar of claim 1, wherein a rate of variation in restoring the correction torque command value to the torque command value is varied according to the torque command value.

3. The control apparatus for an electric railcar of claim 1, wherein a time required for restoring the correction torque command value to the torque command value is the same regardless of the torque command value.

4. The control apparatus for an electric railcar of claim 1, wherein the reference voltage value is varied according to the torque command value.

5. The control apparatus for an electric railcar of claim 1, wherein the reference voltage value is reduced with an increase of the torque command value.

6. A control apparatus for an electric rail car, comprising:
an inverter that exchanges power between the inverter and an alternating-current rotating machine;

a filter capacitor connected in parallel to a direct-current side of the inverter;

a filter reactor provided between the filter capacitor and an overhead line;

a voltage increase detection unit to which an overhead line voltage measured using an overhead line voltage measuring instrument is supplied, the voltage increase detection unit having a variation removal filter that removes, from the overhead line voltage, variation components thereof whose variation rate is higher than that by a predetermined time constant, and sensing an amount of voltage increase occurring when the overhead line voltage goes beyond a reference voltage value and rises as varying at a rate equal to or higher than that by the predetermined time constant by subtracting a voltage output from the variation removal filter from the overhead line voltage of a value larger than the reference voltage value;

a correction torque command value calculation unit that calculates a correction torque command value that is corrected so that a torque command value to be received from an external unit is made smaller for a predetermined time elapsing after the voltage increase detection unit has sensed an amount of voltage increase of a predetermined range or more during regeneration operation of the inverter; and a vector control unit that controls the inverter so that the alternating current rotating machine develops torque coincident with the correction torque command value.

7. The control apparatus for an electric railcar of claim 6, wherein a rate of variation in restoring the correction torque command value to the torque command value is varied according to the torque command value.

8. The control apparatus for an electric railcar of claim 6, wherein a time required for restoring the correction torque command value to the torque command value is the same regardless of the torque command value.

9. The control apparatus for an electric railcar of claim 6, wherein the reference voltage value is varied according to the torque command value.

10. The control apparatus for an electric railcar of claim 6, wherein the reference voltage value is reduced with an increase of the torque command value.

11. A control apparatus for an electric railcar, comprising:
an inverter that exchanges power between the inverter and an alternating-current rotating machine;

a filter capacitor connected in parallel to a direct-current side of the inverter;

a filter reactor provided between the filter capacitor and an overhead line;

an overhead line voltage measuring instrument that measures an overhead line voltage;

a capacitor voltage measuring instrument that measures a voltage across the filter capacitor;

a voltage increase detection unit to which the overhead line voltage measured using the overhead line voltage measuring instrument and a voltage measured using the capacitor voltage measuring instrument are supplied, the voltage increase detection unit sensing an amount of voltage increase occurring when the overhead line voltage goes beyond a reference voltage value and rises as varying at a rate equal to or higher than that by a predetermined time constant by subtracting the voltage output from the capacitor voltage measuring instrument from the overhead line voltage of a value larger than the reference voltage value;

a correction torque command value calculation unit that calculates a correction torque command value that is corrected so that a torque command value to be received from an external unit is made smaller for a predetermined time elapsing after the voltage increase detection unit has sensed an amount of voltage increase of a predetermined range or more during regeneration operation of the inverter; and a vector control unit that controls the inverter so that the alternating current rotating machine develops torque coincident with the correction torque command value.

12. The control apparatus for an electric railcar of claim 11, wherein a rate of variation in restoring the correction torque command value to the torque command value is varied according to the torque command value.

13. The control apparatus for an electric railcar of claim 11, wherein a time required for restoring the correction torque command value to the torque command value is the same regardless of the torque command value.

14. The control apparatus for an electric railcar of claim 11, wherein the reference voltage value is varied according to the torque command value.

15. The control apparatus for an electric railcar of claim 11, wherein the reference voltage value is reduced with an increase of the torque command value.

* * * * *